US010712755B2

(12) United States Patent
Ishii et al.

(10) Patent No.: US 10,712,755 B2
(45) Date of Patent: Jul. 14, 2020

(54) LINEAR SOLENOID VALVE

(71) Applicant: JATCO Ltd, Fuji-shi, Shizuoka (JP)

(72) Inventors: Hideki Ishii, Numazu (JP); Yoshinori Ishimori, Atsugi (JP); Yutaka Hirose, Fuji (JP)

(73) Assignee: JATCO LTD, Fuji-Shi (JP)

( * ) Notice: Subject to any disclaimer, the term of this patent is extended or adjusted under 35 U.S.C. 154(b) by 13 days.

(21) Appl. No.: 16/317,020

(22) PCT Filed: Jul. 5, 2017

(86) PCT No.: PCT/JP2017/024591
§ 371 (c)(1),
(2) Date: Jan. 10, 2019

(87) PCT Pub. No.: WO2018/012357
PCT Pub. Date: Jan. 18, 2018

(65) Prior Publication Data
US 2019/0227579 A1 Jul. 25, 2019

(30) Foreign Application Priority Data
Jul. 12, 2016 (JP) .................................. 2016-137212

(51) Int. Cl.
*F16K 31/06* (2006.01)
*G05D 16/20* (2006.01)
(Continued)

(52) U.S. Cl.
CPC ......... *G05D 16/2022* (2019.01); *F16H 61/02* (2013.01); *F16K 31/06* (2013.01);
(Continued)

(58) Field of Classification Search
CPC ...... F16K 29/00; F16K 31/06; F16K 31/0675; F16H 61/02; F16H 61/0251;
(Continued)

(56) References Cited

U.S. PATENT DOCUMENTS

| 6,170,506 B1 * | 1/2001 | Butwin | F16K 31/0675 |
| | | | 137/15.06 |
| 6,874,525 B2 * | 4/2005 | Kimura | F16H 61/0251 |
| | | | 137/238 |

(Continued)

FOREIGN PATENT DOCUMENTS

JP 2005-054970 A 3/2005

OTHER PUBLICATIONS

PCT International Search Report (with English Language Translation) and PCT Written Opinion (Japanese Language only) dated Aug. 22, 2017.

*Primary Examiner* — Matthew W Jellett
(74) *Attorney, Agent, or Firm* — Foley & Lardner LLP

(57) ABSTRACT

A pressure control valve includes a spool that strokes to one side in the direction of an axis due to the conduction of current to a coil, a spring that urges the spool to the other side in the axis direction, a control device for controlling the conduction of the current to the coil, a determination unit for determining the start of a foreign substance removing operation by the spool, a command value setting unit for setting a command value for the current conducted to the coil, and a dither current setting unit for setting a dither current superimposed on the command value. When the determination unit determines the start of the foreign substance removing operation, the dither current setting unit changes an oscillation frequency of the dither current to an oscillation frequency lower than the frequency at the current point in time, and the command value setting unit periodically increases and reduces the command value on which the changed oscillation frequency is superimposed.

5 Claims, 4 Drawing Sheets

(51) Int. Cl.
*F16H 61/02* (2006.01)
*H01F 7/18* (2006.01)

(52) U.S. Cl.
CPC .......... *H01F 7/18* (2013.01); *F16H 61/0251* (2013.01); *Y10T 137/428* (2015.04); *Y10T 137/4273* (2015.04)

(58) Field of Classification Search
CPC ........ F16H 2061/1268; G05D 16/2022; H01F 7/18; Y10T 137/4273; Y10T 137/428
See application file for complete search history.

(56) References Cited

U.S. PATENT DOCUMENTS

| | | | | |
|---|---|---|---|---|
| 7,192,005 | B2* | 3/2007 | Denyer | F16K 31/0613 137/625.64 |
| 8,151,815 | B2* | 4/2012 | Tabuchi | F16H 61/0251 137/15.01 |
| 9,388,912 | B2* | 7/2016 | Funakubo | F16K 31/0613 |
| 9,787,315 | B1* | 10/2017 | Watanabe | H03M 1/1255 |
| 2005/0028866 | A1 | 2/2005 | Kimura et al. | |
| 2010/0101653 | A1* | 4/2010 | Ogata | F16H 61/12 137/2 |

\* cited by examiner

LINEAR SOLENOID VALVE

CROSS-REFERENCE TO RELATED APPLICATIONS

This application is a National Phase of International Patent Application No. PCT/JP2017/024591 filed on Jul. 5, 2017, which claims priority to Japanese Patent Application No. 2016-137212 filed on Jul. 12, 2016. The contents of these applications are herein incorporated by reference in their entirety.

TECHNICAL FIELD

The present invention relates to a linear solenoid valve.

BACKGROUND TECHNOLOGY

A patent document 1 discloses a two-way linear solenoid valve used in a hydraulic control circuit of an automatic transmission.

This two-way linear solenoid valve is configured to control the opening amount of a pressure adjusting port communicating with a hydraulic circuit by the forward and backward movement in the axis direction of a spool. By this control of the opening amount of the pressure adjusting port to adjust the amount of oil flowing into a drain port from the pressure adjusting port, the oil pressure on a hydraulic circuit side is adjusted. However, in this type of the linear solenoid valve, there is possibility that if foreign substances (for example, sludge) are deposited inside the pressure adjusting port, the movement of the spool is inhibited by the foreign substances, and the oil pressure cannot be appropriately adjusted.

Therefore, a control device of this type of the linear solenoid valve is configured to execute the removing of the deposited foreign substances by operating (hereinafter, also referred to as a foreign substance removing operation) the spool in a predetermined mode, when the reduction of the oil pressure caused by the deposited foreign substances is determined.

When this foreign substance removing operation is performed, the control device sets the opening of the pressure adjusting port to be large for a predetermined time by maintaining the excitation current of the solenoid at a preset maximum valve and minimum value by every predetermined time. At this time, the flow amount of the oil discharged from the pressure adjusting port to the drain port increases, and the deposited foreign substances are discharged from the drain port together with the oil.

However, since, if the amount of the oil discharged from the drain port increases, there is possibility that output pressure is largely lowered, the operation mode to remove the foreign substances can be performed only when the reduction of the output pressure does not affect the automatic transmission. Therefore, it has been required that the removing of the foreign substances can be quickly performed at the time when the necessity of the removing of the foreign substances is confirmed,

PRIOR ART REFERENCE

Patent Document

Patent Document 1: Japanese Patent Application Publication 2005-064970

SUMMARY OF THE INVENTION

In the present invention, a linear solenoid valve includes:
a spool that strokes to one side in an axis direction by conduction of current to a coil;
an urging member that urges the spool to the other side in the axis direction; and
a control part for controlling the conduction of the current to the coil,
wherein an oil pressure in a hydraulic circuit is controlled by adjusting a discharge amount of an oil from a pressure adjusting port communicating with the hydraulic circuit by the spool that strokes in the axis direction,
wherein the control part includes:
a determination unit for determining start of an operation to remove foreign substances by the spool;
a command value setting unit for setting a command value for the current conducted to the coil; and
a dither current setting unit for setting a dither current superimposed on the command value of the current, and
wherein when the determination unit determines the start of the foreign substance removing operation,
the dither current setting unit changes a frequency of the dither current superimposed on the command value of the current to an oscillation frequency lower than the frequency at the current point in time, and
the command value setting unit periodically increases and reduces the command value on which the changed oscillation frequency is superimposed.

According to the present invention, when the frequency of the dither current superimposed on the command value is changed to an oscillation frequency lower than the frequency at the current point in time, the spool vibrates by a small amount in the axis X direction at a cycle longer than that before the oscillation frequency is changed. Consequently, the moving three of the spool increases after the oscillation frequency is changed as compared with that before the change. Therefore, it is possible to push out the deposited foreign substances with the increased moving force of the spool, and thereby the removing of the deposited foreign substances can be more surely performed.

MODE FOR IMPLEMENTING THE INVENTION

Figure 1:
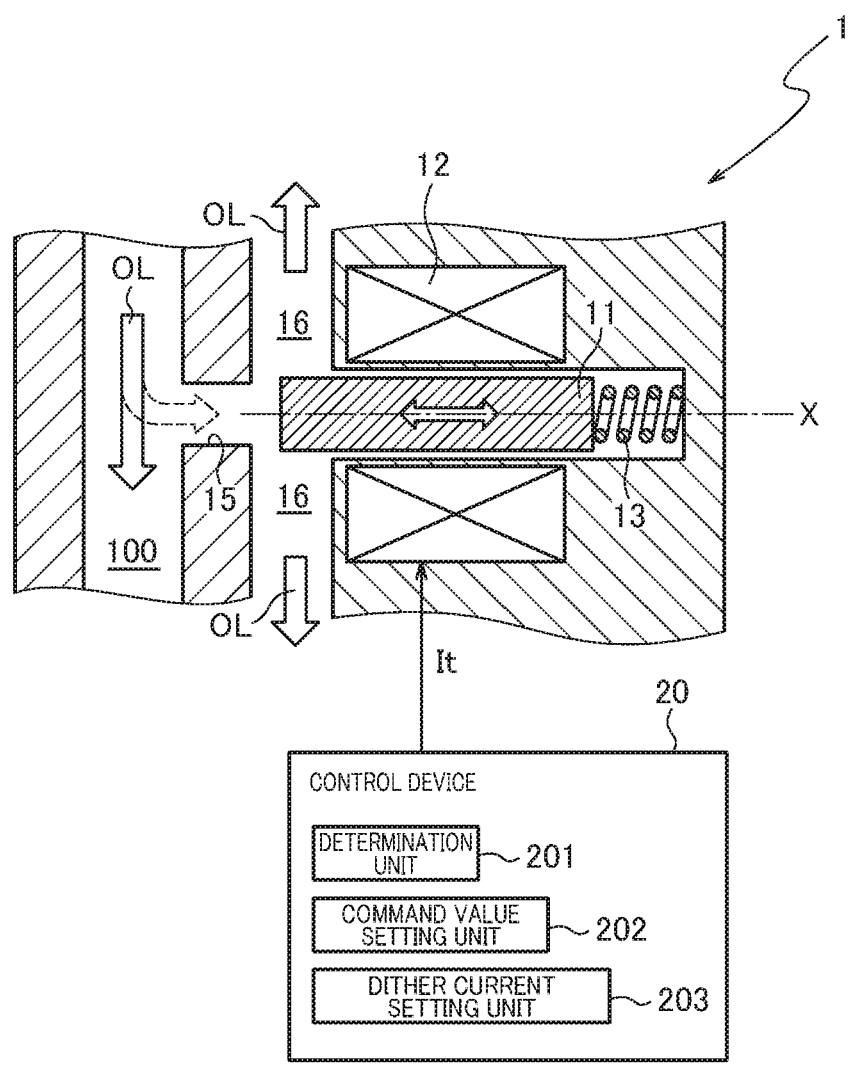
FIG. 1 is an explanatory view of a schematic configuration of a pressure control valve.

In the following, a mode for implementing the present invention will be explained by exemplifying a pressure control valve 1 for controlling the oil pressure of a hydraulic circuit 100 in an automatic transmission for a vehicle. FIG. 1 is an explanatory view of a schematic configuration of the pressure control valve 1 configured by a two-way linear solenoid valve.

The pressure control valve 1 includes a spool 11 that strokes to one side (right side in FIG. 1) in the direction of an axis X due to the conduction of current to a coil 12, a spring 13 (urging member) that urges the spool 11 to the other side (left side in FIG. 1) in the direction of the axis X, and a control device 20 (control part) for controlling the conduction of current to the coil 12.

The pressure control valve 1 further includes a pressure adjusting port 15 that communicates with the hydraulic circuit 100 and a drain port 16 that discharges oil flowing in from the pressure adjusting port 15. This pressure control valve 1 is provided to control the pressure (hereinafter, also referred to as an oil pressure P) of an oil OL inside the hydraulic circuit 100 to a desired pressure.

Here, in the pressure control valve 1, when the spool 11 moves in a direction away from the pressure adjusting port 15 by the conduction of current to the coil 12, the oil OL inside the hydraulic circuit 100 is discharged to a pressure control valve 1 side in accordance with the opening amount of the pressure adjusting port 15, and when the conduction of the current to the coil 12 is completed, by the urging force of the spring 13, the spool 11 moves to a position at which the pressure adjusting port 15 is closed, and then the discharging of the oil OL from the pressure adjusting port 15 is completed.

The spool 11 of the pressure control valve 1 is configured to move forward and backward in the axis X direction by the switching of the conduction/stop of the current to the coil 12. The control device 20 controls the moving amount and moving period of the spool 11 to adjust the discharge amount of the oil from the pressure adjusting port 15, and thereby the pressure (oil pressure P) of the oil OL flowing through the hydraulic circuit 100 is adjusted to a desired pressure.

Here, since the moving amount and the moving period of the spool 11 are determined by a command value It of the current conducted to the coil 12, when a target pressure Pt of the oil pressure P is determined from a traveling condition of a vehicle, the control device 20 controls the command value It of the current conducted to the coil 12 with time so as to achieve the determined target pressure Pt.

In the pressure control valve 1, since the movement of the spool 11 to one side in the axis X direction is performed by using a magnetic force generated by the conduction of the current to the coil 12, foreign substances such as metal powder included in the oil are deposited inside or around the pressure adjusting port 15 due to the attraction of a residual magnetic force. The deposited foreign substances prohibit the movement of the spool 11 in the axis X direction or the closing of the pressure adjusting port 15 by the spool 11. In this case, the adjustment of the pressure to the target pressure Pt is inhibited.

As one operation mode of the spool 11 by the control device 20, an operation mode (foreign substance removing operation) for the stroking of the spool 11 to remove the deposited foreign substances is therefore prepared for occurrence of pressure adjusting fault caused by the depositing of the foreign substances.

The control device 20 includes a determination unit 201 for determining the start of the foreign substance removing operation, a command value setting unit 202 for setting the command value. It for the current conducted to the coil 12, and a dither current setting unit 203 for setting a dither current Id superimposed on the command value it for the current.

Figure 2:
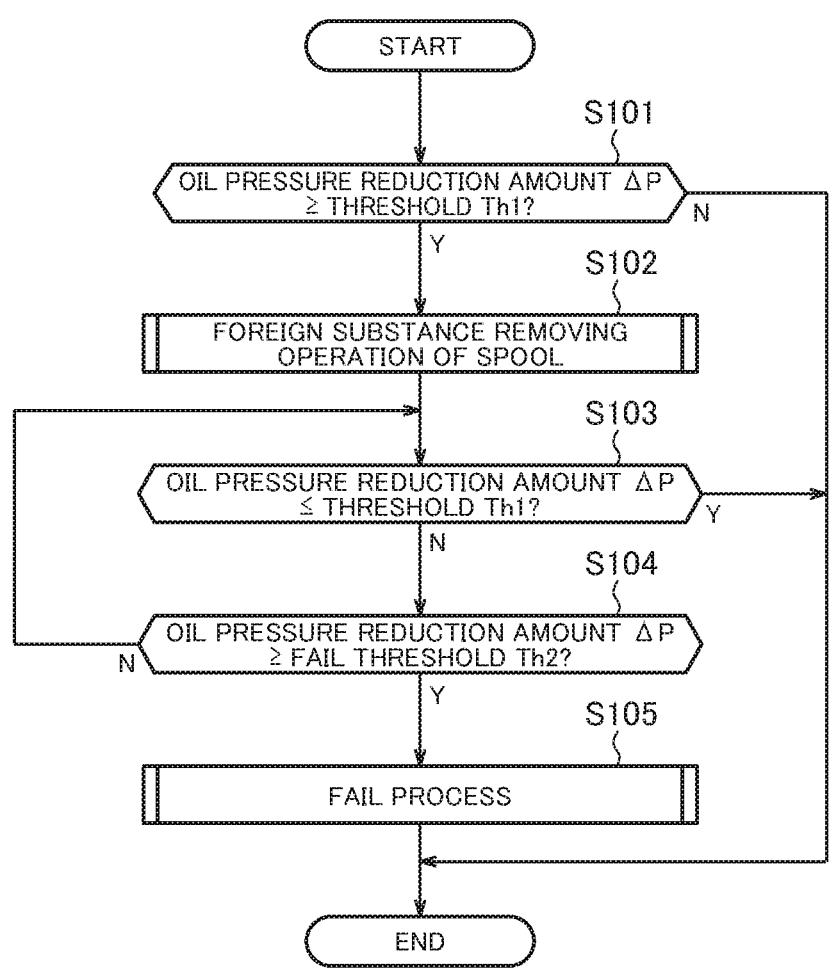
FIG. 2 is a flow chart for explaining a process at the time of the execution of a foreign substance removing operation.
Figure 3:
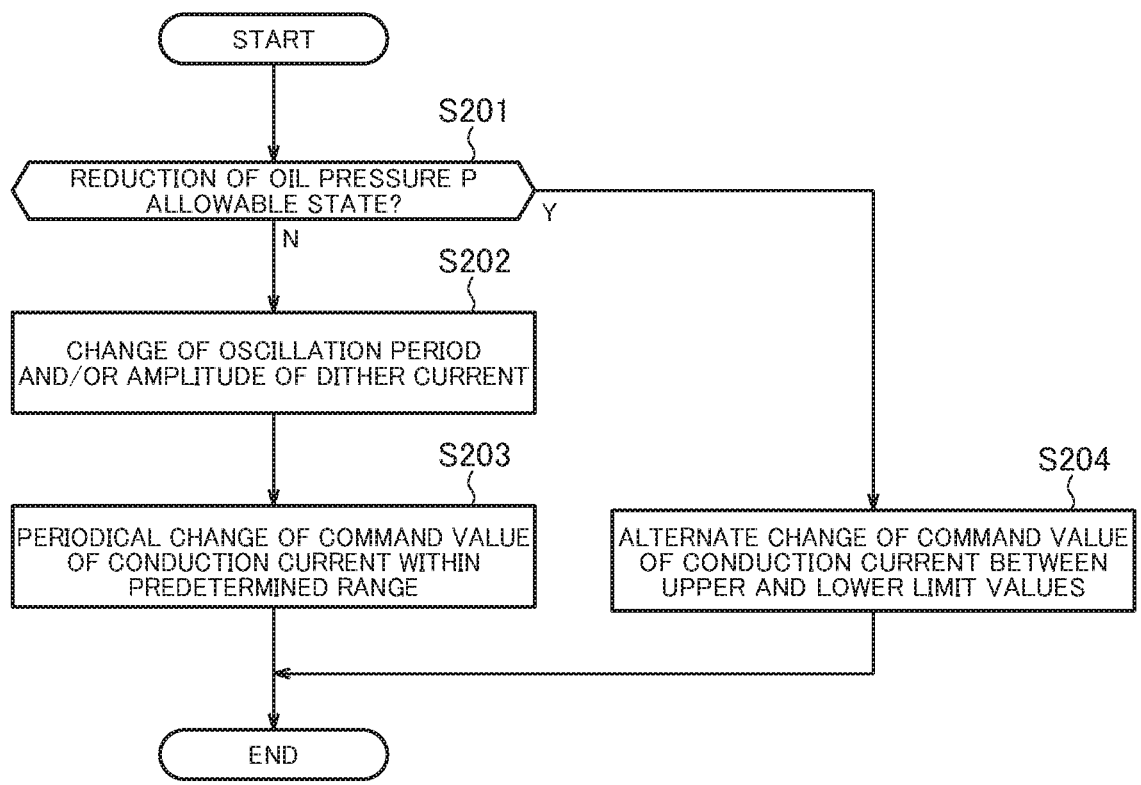
FIG. 3 is a flow chart for explaining a process at the time of the execution of the foreign substance ring operation.
Figure 4A:
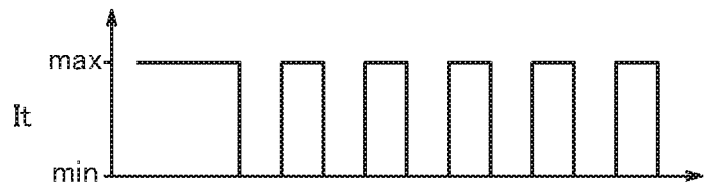
FIG. 4 is an explanatory view of an output waveform of a command value of current conducted to a coil and a waveform of a dither current.
Figure 4B:
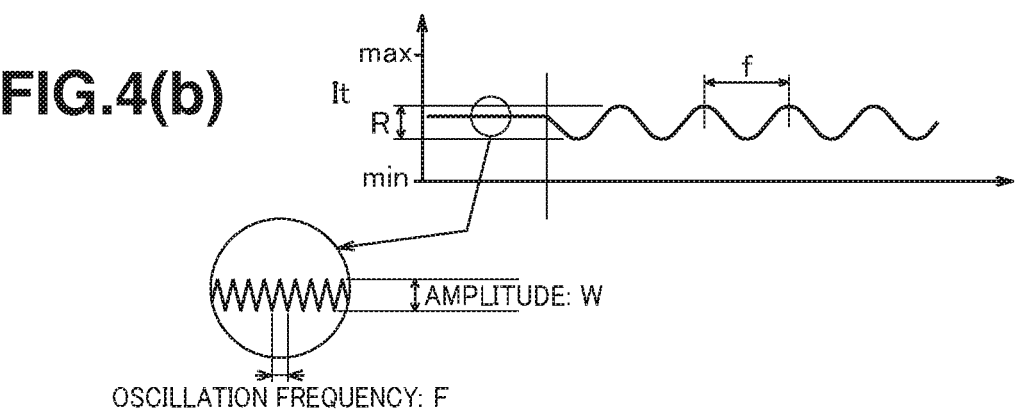
Figure 4C:
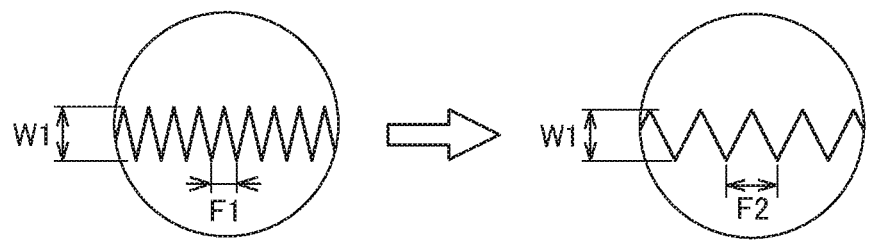
Figure 4D:
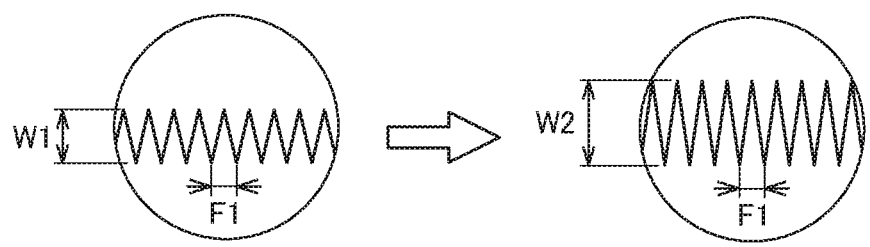
Figure 4E:
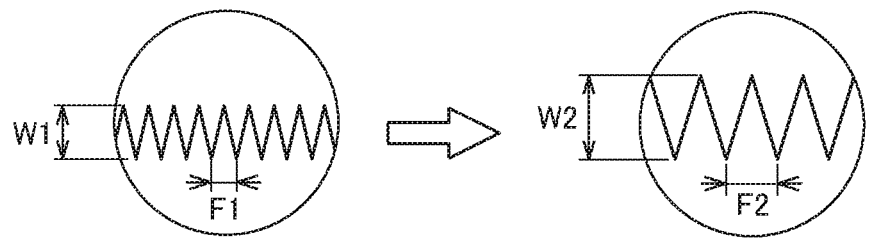

In the following, the foreign substance removing operation of the spool 11 by the control device 20 will be explained. FIG. 2 and FIG. 3 each are a flow chart for explaining a process of the control device 20 at the time of the execution of the foreign substance removing operation. FIG. 4 is an explanatory view of an output waveform of the command value It for the current conducted to the coil 12 and a waveform of the dither current superimposed on the command value It, at the time of the foreign substance removing operation. FIG. 4(a) is an explanatory view of the output waveform of the command value It of the current when the foreign substance removing operation is performed in a state in which the reduction of the oil pressure P is allowed. FIG. 4(b) is an explanatory view of the output waveform of the command value It of the current when the foreign substance removing operation is performed in a state in which the reduction of the oil pressure P is not allowed. FIG. 4(c) to FIG. 4(e) each are an explanatory view of the controlling of the dither current Id when the foreign substance removing operation is performed in a state in which the reduction of the oil pressure P is not allowed. FIG. 4(c) is an explanatory view when the oscillation frequency of the dither current Id is changed. FIG. 4(d) is an explanatory view when the amplitude of the dither current Id is changed. FIG. 4(e) is an explanatory view when both of the oscillation frequency and the amplitude of the dither current Id are changed.

The series of processes (FIG. 2, FIG. 3) for the operation of the removing of the foreign substances (foreign substance removing operation) by the spool 11 are executed during the regular operation control of the spool 11 by the control device 20, when the determination unit 201 determines that the foreign substance removing operation by the spool 11 is necessary. In a step S101, the determination unit 201 determines the necessity of the start of the foreign substance removing operation performed by the spool 11. Specifically, the determination unit 201 calculates a difference ΔP(=Pt−Pr) between an actual pressure Pr of the oil in inside the hydraulic circuit 100 and the target value (target pressure Pt) of the pressure of the oil 04 and determines the start of the foreign substance removing operation when the calculated difference ΔP is equal to or greater than a threshold Th1 for determining the start of the foreign substance removing operation.

Here, when the movement of the spool 11 is inhibited by the deposited foreign substances and then the closing of the pressure adjusting port 15 is inhibited or delayed, the actual pressure Pr of the oil OL flowing through the hydraulic circuit 100 is reduced, and the difference ΔP between the actual pressure Pr and the target pressure Pt becomes large. Therefore, in the embodiment, when the reduction amount (difference ΔP) from the target pressure Pt of the pressure becomes the threshold Th1 or greater, the start of the foreign substance removing operation is determined.

When the start of the foreign substance removing operation is determined (step S101, Yes), in a step S102, the command value setting unit 202 outputs the command value It of the current conducted to the coin 12 in a mode at the time when the foreign substance removing operation of the spool 11 is performed.

Here, the details of this step S102 will be explained by using the flow chart in FIG. 3. As shown in FIG. 3, when the foreign substance removing operation of the spool 11 is started, in a step S201, the determination unit 201 determines whether the reduction of the oil pressure P in the hydraulic circuit 100 is in an allowed state or not.

When the reduction of the oil pressure P in the hydraulic circuit 100 does not affect the operation of an automatic transmission, for example, when the oil pressure P in the hydraulic circuit 100 after pressure control by the pressure control valve 1 is not used for the fastening of a friction fastening element of the automatic transmission or a vehicle mounting the automatic transmission stops in a state in which an engine is driven, it is determined that the reduction of the oil pressure P is allowed. In addition, in a case of a state in which the reduction of the oil pressure P in the hydraulic circuit 100 affects the operation of the automatic transmission, such as a vehicle traveling state, it is determined that the reduction of the oil pressure P is not allowed.

In a case where the reduction of the oil pressure P is not allowed (step S201, No), in a step S202, the dither current setting unit 203 sets the dither current Id superimposed on the command value It of the current conducted to the coil 12.

Specifically, the dither current setting unit 203 executes any of the following (A) to (C), and sets a changed dither current Id of which at least one of an oscillation frequency F and an amplitude W is different from that of the dither current Id at the current point in time.

(A) The oscillation frequency F of the dither current Id which is periodically and repeatedly increased and reduced (see FIG. 4(b)) is changed to an oscillation frequency lower than the frequency at the current point in time (FIG. 4(c): F1→F2).

(B) The amplitude W of the dither current Id which is periodically and repeatedly increased and reduced is set to an amplitude larger than the amplitude at the current point in time (FIG. 4(d): W1→W2).

(C) The change of the oscillation frequency F to an oscillation frequency lower than the frequency at the current point in time and the change of the amplitude W to an amplitude larger than the amplitude at the current point in time are performed (FIG. 4(e): F1→F2, W1→W2).

In a next step S203, the command value setting unit 202 executes the conduction of the current to the coil 12 while periodically increasing and reducing the command value It on which the changed oscillation frequency is superimposed.

Consequently, the output waveform of the command value It of the current conducted to the coil 12 becomes a waveform alternately repeating the increasing and reducing at a predetermined cycle f within a predetermined range R (see FIG. 4(b)) while vibrating by a small amount.

When the oscillation frequency F of the dither current Id superimposed on the command value It is changed to an oscillation frequency lower than the frequency at the current point in time (see FIG. 4 (c)), the spool 11 vibrates by a small amount in the axis X direction at a cycle longer than that before the oscillation frequency is changed. Consequently, if the spool 11 strokes with the same command value It, when the oscillation frequency is changed to be lower, the moving force of the spool 11 increases in comparison with that before the change. Therefore it is possible to push out the deposited foreign substances with the increased moving force of the spool 11, and the removing of the deposited foreign substances can be more surely performed.

In addition, when the amplitude W of the dither current Id is changed to an amplitude wider than the amplitude at the current point in time (see FIG. 4(d)), the fluctuation width of the command value It becomes large within a range where the spool 11 does not move. Consequently, the spool 11 vibrates by a small amount in the axis X direction with a force larger than that before the amplitude is changed. With this, since the resistance (sliding resistance) at the time when the spool 11 is moved becomes small, if the spool 11 strokes with the same command value It, when the amplitude is changed to be wider, the moving force of the spool 11 increases in comparison with that before the change. Therefore it is possible to push out the deposited foreign substances with the increased moving force of the spool, and the removing of the deposited foreign substances can be more surely performed.

In addition, when both of the oscillation frequency F and the amplitude W of the dither current Id are changed to a lower oscillation frequency and a wider amplitude respectively (see FIG. 4(e)), the moving force of the spool also increases by receiving the influence of both of a change in the oscillation frequency and a change in the amplitude. Therefore, since the deposited foreign substances can be pushed out by the increased moving force of the spool, the removing of the deposited foreign substances can be more surely performed.

Moreover, in the embodiment, the conduction of the current to the coil 12 is performed while the command value It on which the changed oscillation frequency is superimposed is periodically increased and reduced within the predetermined range R (see FIG. 4(b)).

In addition, in consideration of the discharge amount of the oil OL from the drain port 16, the predetermined range R regulating the upper limit and the lower limit of the command value It is set to a range where the oil pressure P after the pressure control by the pressure control valve 1 does not become an oil pressure below a lower limit value at which the reduction of the oil pressure required at that time is allowed. In the embodiment, based on simulation or test results, the predetermined range R in each target value (oil pressure P) of the oil pressure after the pressure control is regulated, and when the command value It is periodically changed in the step S203, the command value setting unit 202 reads one predetermined range R determined according to the target value (oil pressure F) of the oil pressure after the pressure control at that time from a storage part which is not shown in the drawings, and changes the command value It within the read predetermined range R.

Consequently, even if the reduction of the oil pressure P is not allowed, the foreign substance removing operation of the spool 11 can be performed while securing a minimum required oil pressure P, and thereby an abnormal state caused by the reduction of the oil pressure due to the foreign substances can be quickly eliminated.

On the other hand, in the step S201 mentioned above, when the reduction of the oil pressure P is allowed (step S201, Yes), in a step S204, the command value setting unit 202 executes the conduction of the current to the coil 12 such that the command value It of the current conducted to the coil alternately repeats a maximum value I_max and a minimum value I_min of the command value It by every predetermined time. Consequently, the output waveform of the command value It of the current conducted to the coil 12 becomes a waveform alternately repeating the maximum value I_max and the minimum value I_min by every predetermined time (see FIG. 4 (a)).

When the reduction of the oil pressure P is allowed, there is no problem even if the oil pressure P after the pressure control by the pressure control valve 1 becomes low, and therefore the command value It of the current conducted to the coil alternately repeats the maximum value I_max and the minimum value I_min of the command value by every predetermined time to maximizing the moving amount of the spool 11.

Returning to the flow chart in FIG. 2, when the foreign substance removing operation of the spool in the step S102 is executed in a different mode according to whether the reduction of the oil pressure P is allowed or not, in a step S103, the determination unit 201 confirms whether the difference ΔP between the actual pressure Pr (actual oil pressure) of the oil OL flowing inside the hydraulic circuit 100 and the target pressure Pt of the oil pressure becomes lower than the threshold Th1 or not. When the deposited foreign substances are removed by the foreign substance removing operation of the spool 11, the oil pressure P inside the hydraulic circuit 100 rises, and the difference ΔP becomes small.

When, the difference ΔP becomes lower than the threshold Th1, the removing of the deposited foreign substances is completed, and the process for the foreign substance removing operation of FIG. 2 is finished.

On the other hand, when the difference ΔP does not become lower than the threshold Th1 (step S103, No), the removing of the deposited foreign substances is not completed. In this case, in a step S104, the determination unit 201 confirms whether the difference ΔP between the oil pressure P inside the hydraulic circuit 100 and the target pressure Pt of the oil pressure P is equal to or greater than a fail threshold Th2 for determining an abnormality inside the hydraulic circuit 100 or not.

Since there is possibility that the reduction of the oil pressure is not caused by the deposited foreign substances, in the embodiment, by comparing with the fail threshold. Th2 for determining whether the occurrence of an abnormality is clearly in the hydraulic circuit 100 or not, it is confirmed just in case whether the reduction of the oil pressure P is clearly caused by the abnormality in the hydraulic circuit 100 or not.

Then, when the difference ΔP is equal to or greater than the fail threshold Th2 (step S104, Yes), the process proceeds to the step S105, and the determination unit 201 executes a fail process for informing the abnormality in the hydraulic circuit 100. With this, for example, a warning light (not shown in the drawings) in an instrument panel is operated in a mode for informing the abnormality.

On the other hand, when the difference ΔP is lower than the fail threshold Th2 (step S104, No), the process is returned to the process of the step S103. With this, the process of the step S103 and the process of the step S104 are repeatedly executed until the difference ΔP becomes lower than the threshold Th1 (step S103, Yes) or the difference ΔP becomes equal to or greater than the fail threshold Th2 (step S104, Yes).

Consequently, when the deposited foreign substances are removed by the foreign substance removing operation of the spool 11 in the middle of the repeating of the process in the step S103 and the process in the step S104, the process of FIG. 2 is finished.

As the above, in the embodiment,
(1) a pressure control valve 1 (linear solenoid valve) includes:
a spool 11 that strokes to one side in an axis X direction by conduction of current to a coil 12;
a spring 13 (urging member) that urges the spool 11 to the other side in the axis X direction; and
a control device 20 (control part) for controlling the conduction of the current to the coil 12,
wherein a pressure (oil pressure P) of an oil OL on a hydraulic circuit 100 side is controlled by adjusting the discharge amount of the oil OL from a pressure adjusting port 15 communicating with the hydraulic circuit 100 by the spool 11 that strokes in the axis X direction,
wherein the control device 20 includes:
a determination unit 201 for determining the start of an operation to remove foreign substances by the spool 11;
a command value setting unit 202 for setting a command value It for the current conducted to the coil 12; and a dither current setting unit 203 for setting a dither current Id superimposed on the command value It of the current, and
wherein when the determination unit 201 determines the start of the foreign substance removing operation,
the dither current setting unit 203 changes an oscillation frequency F of the dither current Id superimposed on the command value It to an oscillation frequency lower than the frequency at the current point in time, and
the command value setting unit 202 periodically increases and reduces the command value It on which the changed oscillation frequency F is superimposed.

In the above configuration, when the oscillation frequency F of the dither current Id superimposed on the command value It is changed to an oscillation frequency lower than the frequency at the current point in time, the spool 11 vibrates by a small amount in the axis X direction at a cycle longer than that before the oscillation frequency is changed. Consequently, the moving force of the spool 11 increases after the oscillation frequency F is changed as compared with that before the change. Therefore, by the increased moving force of the spool 11, for example, it is possible to push out the foreign substances deposited in the pressure adjusting port 15 or around thereof, and the removing of the deposited foreign substances can be more surely performed. In addition, since only the moving force of the spool 11 is increased without changing the pressure control point of the spool 11, the removing the deposited foreign substances can be performed without changing the oil pressure P of the hydraulic circuit 100 after the pressure control by the pressure control valve 1.

(2) When the determination unit 201 determines the start of the foreign substance removing operation, the command value setting unit 202 periodically increases and reduces the command value It on which the changed oscillation frequency F is superimposed, within a predetermined range R between the maximum value I_max and the minimum value I_min of the command value Iit.

In the above configuration, when the command value It is periodically changed within the predetermined range R, in the range in which the command value It is changed, the spool 11 can stroke smoothly. Consequently, as compared with a case where the command value It is alternately switched between the maximum value I_max and the minimum value I_min, the amount of the oil OL discharged from the pressure adjusting port 15 can be suppressed, and, at the time of the foreign substance removing operation of the spool 11, it is possible to suppress that the oil pressure P inside the hydraulic circuit 100 is rapidly lowered to an oil pressure lower than the minimum pressure at which the reduction of the pressure can be allowed, at that time. With this, by appropriately setting the predetermined range R, even while the automatic transmission is driven with the oil pressure P inside the hydraulic circuit 100 adjusted in pressure by the pressure control valve 1, the foreign substance removing operation by the spool 11 can be performed without lowing the oil pressure P of the oil OL, inside the hydraulic circuit 100 to an oil pressure lower than the allowable minimum pressure at that time.

(3) When the spool 11 is driven with the command value It on which the dither current Id in which the oscillation frequency F and/or the amplitude W is changed is superimposed, the predetermined range R is set based on a discharge amount that is a discharge amount of the oil OL from the pressure adjusting port 15 and in which the pressure (oil pressure P) of the oil OL on the hydraulic circuit 100 side can be maintained at or greater than an allowable minimum oil pressure at that time.

In the above configuration, even when the reduction of the oil pressure P is not allowed, the foreign substance removing operation of the spool 11 can be performed while securing a minimum required oil pressure, and thereby the reduction of the oil pressure caused by the foreign substances can be quickly eliminated.

(4) After maintaining the command value It, on which the dither current Id in which the oscillation frequency F and/or the amplitude W is changed is superimposed, for a predetermined time, the command value setting unit 202 periodically increases and reduces the command value It within the predetermined range R between the maximum value I_max and the minimum value I_min of the command value (see FIG. 4(*b*)).

By maintaining the command value It at a constant value for a predetermined time, command value on which the dither current Id in which the oscillation frequency F and/or the amplitude V is changed is superimposed, before the command value It is periodically increased and reduced, the spool 11 can be made in a state of vibrating by a small amount. Consequently, the moving force of the spool 11 at the time when the increasing and reducing of the command value It starts can be maximized, and it is possible to push out the deposited foreign substances with the maximized moving force of the spool.

The determination unit 201 confirms whether the reduction of the oil pressure P is allowed or not when the start of the foreign substance removing operation is determined, when the reduction of the oil pressure P is not allowed, the command value setting unit 202 periodically increases and reduces the command value It on which the changed oscillation frequency F is superimposed within the predetermined range R between the maximum value I_max and the minimum value I_min of the command value It, and when the reduction of the oil pressure P is allowed, the command value setting unit 202 sets the command value It so as to alternately repeat the maximum value I_max and the minimum value I_min of the command value It by every predetermined time.

In the above configuration, when the reduction of the oil pressure P in the hydraulic circuit 100 has no effect on the operation of the automatic transmission, for example, when the pressure (oil pressure P) of the oil OL in the hydraulic circuit 100 after the pressure control is not used for the fastening of the friction fastening element of the automatic transmission or the vehicle mounting the automatic transmission stops in a state in which the engine is driven, it is determined that the reduction of the oil pressure P is allowed, and the moving amount of the spool 11 is maximized, and the removing of the deposited foreign substances is performed. In addition, in a case of a state in which the reduction of the pressure (oil pressure P) of the oil OL in the hydraulic circuit 100 affects the operation of the automatic transmission, such as a vehicle traveling state, it is determined that the reduction of the oil pressure P is not allowed, and the moving force of the spool 11 is maximized, and the removing of the deposited foreign substances is performed. Therefore, when the determination unit 201 determines the start of the foreign substance removing operation, an appropriate driving mode of the spool 11 is selected according to the use state (use state of the oil pressure P adjusted by the pressure control valve 1) of the oil pressure P at that time, and then the removing of the deposited foreign substances is performed.

In addition, when the reduction of the pressure (oil pressure P) of the oil OL on a hydraulic circuit 100 side is allowed, the command value It alternately repeating the maximum value I_max and the minimum value I_min by every predetermined time may be a command value It on which the dither current Id in which the oscillation frequency F and/or the amplitude W is changed is superimposed, or may be a command value It on which the dither current Id is not superimposed.

The invention claimed is:

1. A linear solenoid valve, comprising:
    a spool that strokes to one side in an axis direction by conduction of current to a coil;
    an urging member that urges the spool to the other side in the axis direction; and
    a control part for controlling the conduction of the current to the coil,
    wherein an oil pressure in a hydraulic circuit is controlled by adjusting a discharge amount of an oil from a pressure adjusting port communicating with the hydraulic circuit by the spool that strokes in the axis direction,
    wherein the control part includes:
        a determination unit for determining start of an operation to remove foreign substances by the spool;
        a command value setting unit for setting a command value for the current conducted to the coil; and
        a dither current setting unit for setting a dither current superimposed on the command value of the current, and
    wherein when the determination unit determines the start of the foreign substance removing operation,
        the dither current setting unit changes an oscillation frequency of the dither current superimposed on the command value of the current to an oscillation frequency lower than an oscillation frequency at a current point in time, and
        the command value setting unit periodically increases and reduces the command value on which the changed oscillation frequency is superimposed.

2. The linear solenoid valve according to claim 1, wherein when the determination unit determines the start of the foreign substance removing operation, the command value setting unit periodically increases and reduces the command value on which the changed oscillation frequency is superimposed, within a predetermined range between a maximum value and a minimum value of the command value.

3. The linear solenoid valve according to claim 2, wherein when the spool is driven with the command value on which the changed oscillation frequency is superimposed, the predetermined range is set based on a discharge amount that is a discharge amount of the oil from the pressure adjusting port and in which the oil pressure of the hydraulic circuit can be maintained at or greater than an allowable minimum oil pressure at that time.

4. The linear solenoid valve according to claim 2, wherein after maintaining the command value on which the changed oscillation frequency is superimposed for a predetermined time, the command value setting unit periodically increases and reduces the command value within the predetermined range between the maximum value and the minimum value of the command value.

5. The linear solenoid valve according to claim 2, wherein the determination unit confirms whether the reduction of the oil pressure of the hydraulic circuit is allowed or not,
    wherein when the reduction of the oil pressure of the hydraulic circuit is not allowed, the command value setting unit periodically increases and reduces the command value on which the changed oscillation frequency is superimposed within the predetermined range between the maximum value and the minimum value of the command value, and
wherein when the reduction of the oil pressure of the hydraulic circuit is allowed, the command value setting unit sets the command value of the current so as to alternately repeat the maximum value and the minimum value of the command value by every predetermined time.

* * * * *